UNITED STATES PATENT OFFICE.

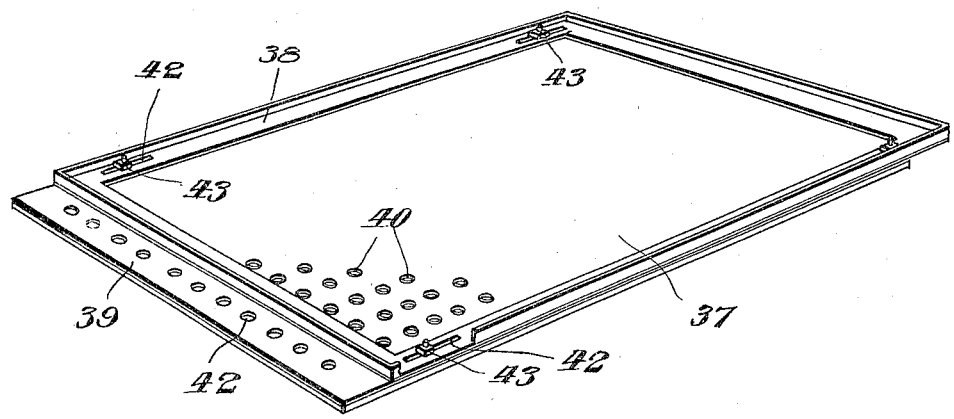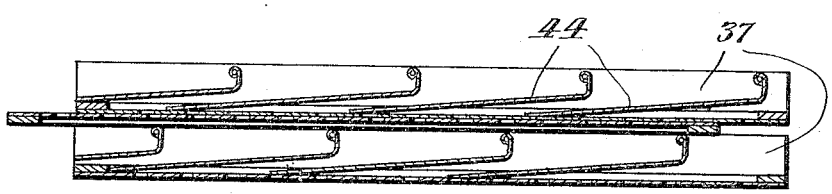

RALPH ROBERT VENUS, OF REGINA, SASKATCHEWAN, CANADA, ASSIGNOR OF ONE-HALF TO RUSSEL L. DELAHAY, OF REGINA, SASKATCHEWAN, CANADA.

GRAIN SEPARATOR AND GRADER.

1,179,875.  Specification of Letters Patent.  Patented Apr. 18, 1916.

Application filed July 16, 1914. Serial No. 851,278.

*To all whom it may concern:*

Be it known that I, RALPH ROBERT VENUS, a subject of the King of Great Britain, and resident of the city of Regina, Province of Saskatchewan, Dominion of Canada, have invented certain new and useful Improvements in Grain Separators and Graders, of which the following is the specification.

This invention relates to that type of machine that cleans, separates and grades the grain as it is carried therethrough and the objects of the invention are to improve the construction and arrangement of the receiving hopper so as better to control the flow of grain being fed therefrom, to render the upper shoe capable of being oscillated, to permit of the sieves mounted in the upper shoe being regulated to suit any kind of grain, to facilitate in blowing off and separating the chaff and seeds, to deliver light seeds separated from the primary grain to the side of the machine, to so control the draft that it can be easily adapted to suit any and all kinds of grain and other objects which will be shown hereafter and it consists essentially of the improved construction of machine particularly described and set forth in the following specification and accompanying drawings forming part of the same.

Figure 1:
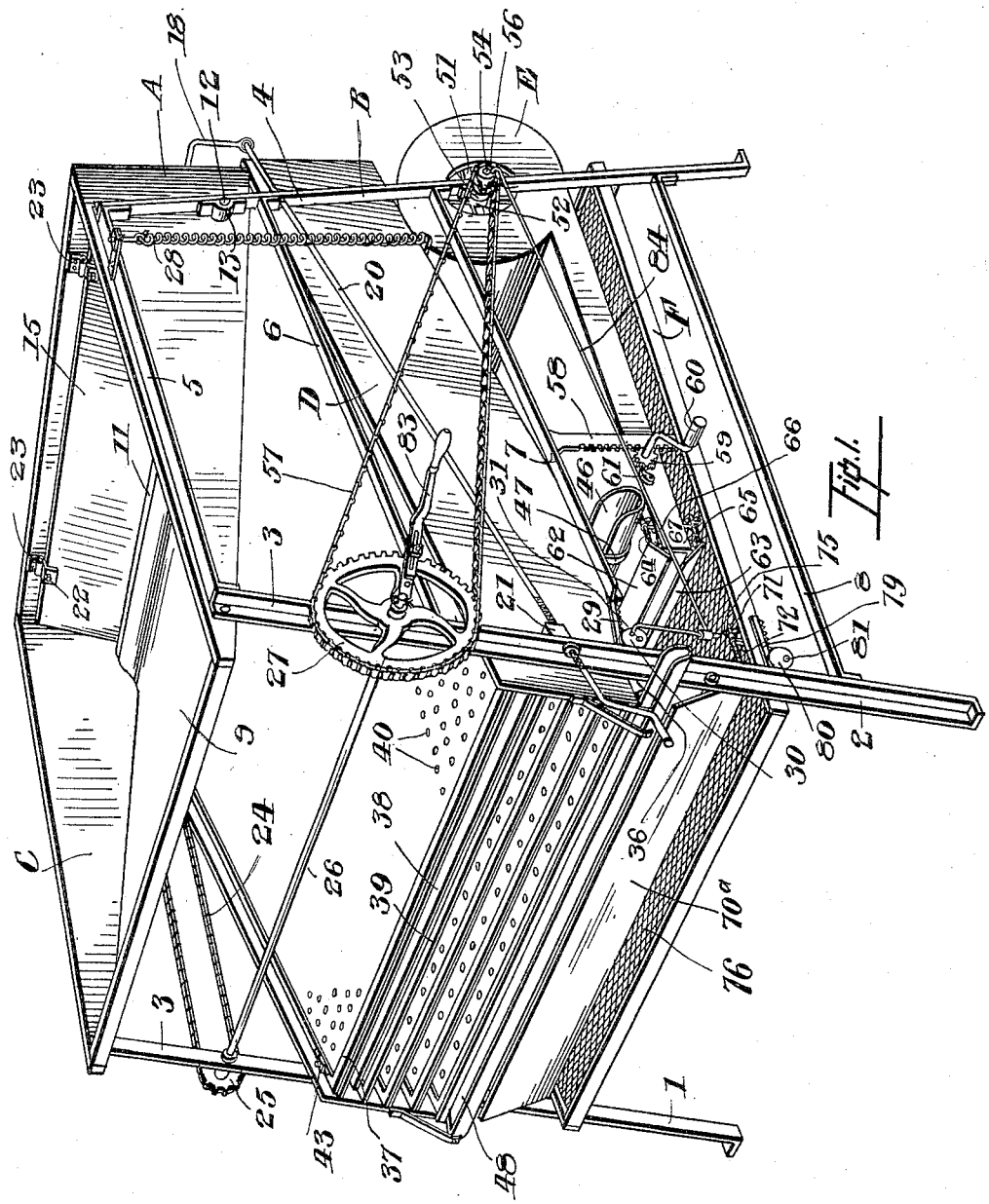
Figure 2:
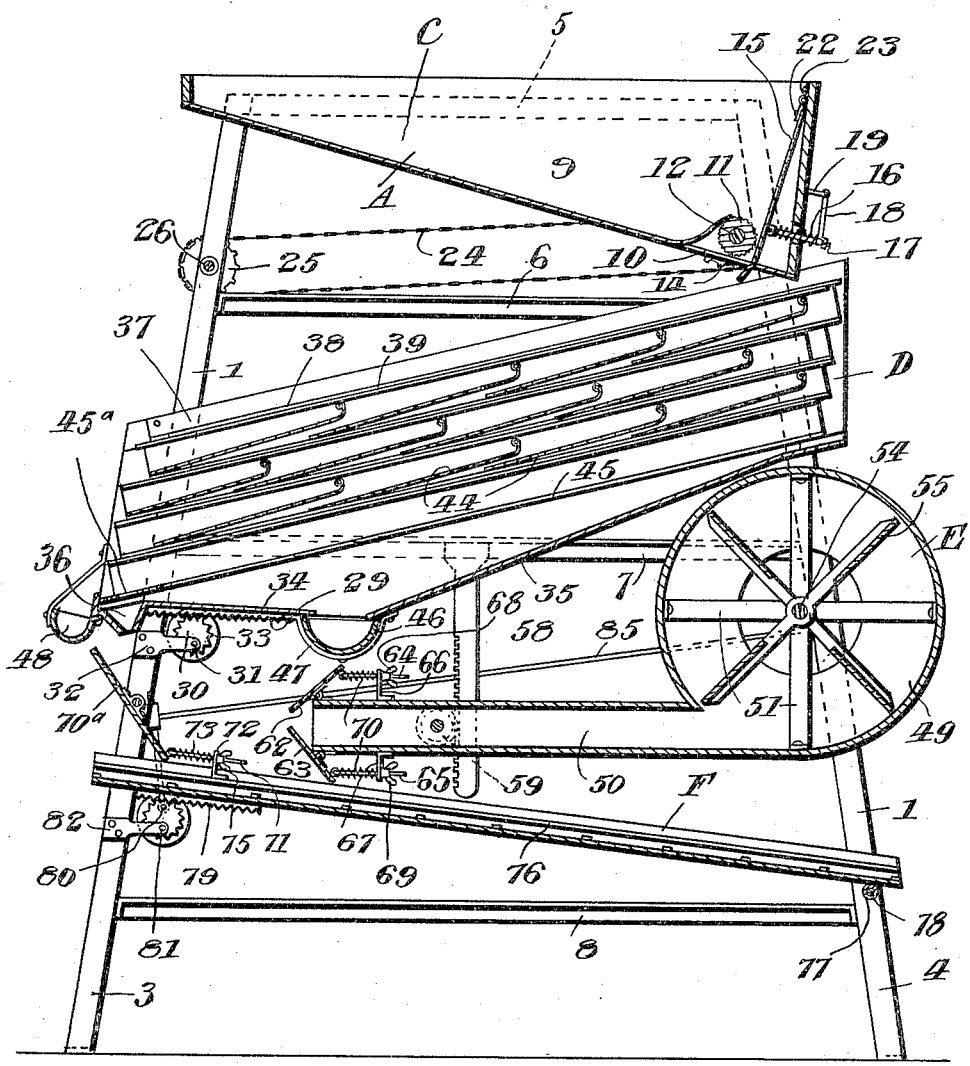
Figure 3:
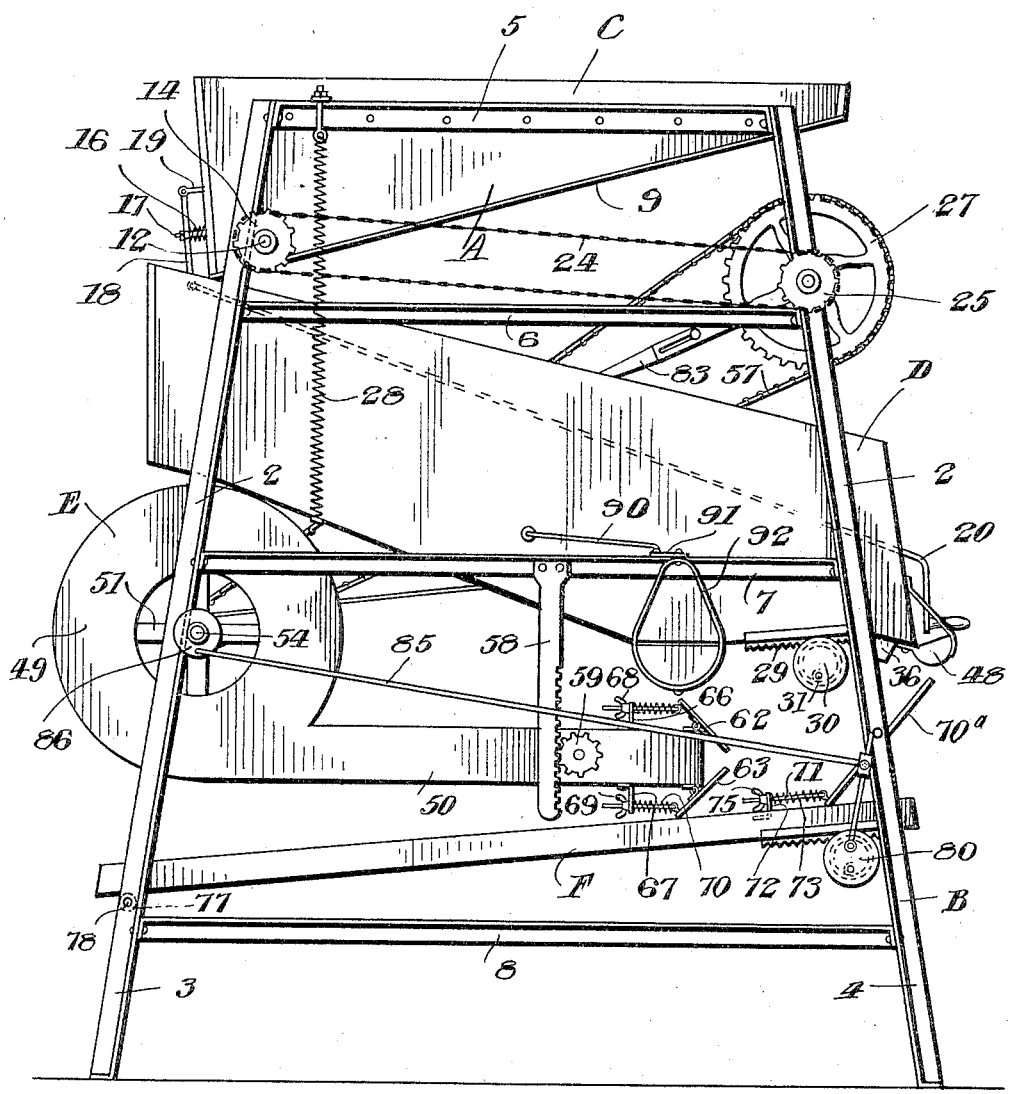

In the drawings; Figure 1 is a perspective view of the improved machine. Fig. 2 is a sectional elevation of the same. Fig. 3 is a side elevation of the improved machine. Fig. 4 is a perspective view of the sieves mounted in the upper shoe showing the construction of the same and manner of adjustment. Fig. 5 is a sectional elevation of two sets of sieves located in the upper shoe showing the baffle plates located between the same. Fig. 6 is a cross section of part of the fan casing showing the manner of mounting the same to the frame of the machine to permit of the discharge conduit being elevated and lowered.

Like characters of reference refer to like parts in the several drawings.

Referring to the drawings, A represents the improved machine comprising the frame B, the receiving hopper C, the upper shoe D, the fan E and the lower shoe F, the construction and arrangement of the several parts being fully described later.

The frame B is preferably made of angle sections and comprises the side principles 1 and 2 each of which consists of the upwardly disposed members 3 and 4 suitably connected by the transversely extending members 5, 6, 7, and 8 which are flanged on the ends thereby facilitating in their being fixed to the upwardly disposed members 3 and 4 by rivets or the like.

The hopper C is designed to be rigidly secured to the upper end of the frame B in any suitable manner, such hopper being of any convenient shape preferably formed with an inclined bottom 9 having a discharge orifice 10 located at the lower end thereof and through which stock is designed to be fed, the upper lip of the said discharge orifice being bent upwardly into the hopper while the lower lip is bent downwardly and projects below the lower face of the bottom 9.

The means which I employ to control the feed of the stock from the hopper C comprises a transversely extending roller 11 located beneath the upper lip of the discharge orifice 10, such roller being rigidly mounted on a spindle 12 which in turn is rotatably carried in the bearings 13 fixed to the upwardly disposed members 4 of the frame B, one end of the said spindle being provided with a sprocket wheel 14 rigidly mounted thereon.

Acting in conjunction with the roller 11 is a hinged plate 15 which is located in the hopper and is adapted to be operated in such a manner that the width of the discharge orifice 10 may be regulated as found desirable without necessitating the closing down of the machine.

The outer periphery of the roller 11 is preferably roughened to such an extent as will permit of the stock freely passing between the plate 12 and the said roller when the same are just separated but will not permit of the escape of the stock when the plate 15 is in close proximity to the roller.

To prevent any jar in the operation of the plate 15, a spiral spring 16 is located at the back thereof, such spring being mounted on the rod 17, the inner end of which abuts the back of the plate 15, the outer end being designed to pass through the crank lever 18 and be secured thereto by means of a nut, one end of such crank lever being pivotally mounted to the bracket 19 carried by the back of the hopper, the other end being pivotally connected to the rod 20 which is provided with a thread intermediate of its ends adapted to engage with the nut 21 rigidly mounted on the upwardly disposed member 3 of the frame B, the other end of the rod 20 being provided with a suitable crank handle adapted to actuate the same.

It will be clear that in the operation of the plate 15 the lower edge must always be in contact with the bottom of the hopper and to this end the upper edge of the plate is provided with pins 22 slidably mounted in slots in the hinges 23.

The roller 11 is adapted to be rotated through the medium of the chain 24 which passes over the sprocket wheel 14 and engages with the sprocket wheel 25 rigidly mounted on the transversely extending spindle 26 rotatably mounted in the frame B, the other end of the said spindle being provided with a driving sprocket wheel 27 rigidly mounted thereon.

The upper shoe D is located below the hopper C and is suspended at the back by means of the spiral springs 28, the upper ends of which are supported from the transversely extending member 5, the lower end being connected to brackets mounted on the lower face of the said shoe, the front of the shoe being provided on its bottom face with a rack 29 designed to engage with the pinion wheel 30 eccentrically mounted on the transversely extending rod 31 which in turn is rotatably mounted in the brackets 32. The pinion wheel 30 is provided with an outer flange 33 designed to prevent the rack 29 becoming disengaged from the said pinion.

The shoe D is disposed at an angle to the horizontal plane and is provided with downwardly sloping and converging bottom plates 34 and 35, the former of which is provided at its outer end with a downwardly disposed chute 36.

The shoe D is provided with a plurality of suitably disposed sieves 37 which in the embodiment illustrated consists of two plates 38 and 39 adapted to coöperate with each other, such plates being provided with a plurality of orifices 40, the upper plates 38 having longitudinally extending slots 42 designed to slidably engage with the studs 43 mounted on the lower plate 39 by means of which studs the said plates may be adjusted so that the orifices 40 and 41 may overlap each other or are closed as is found desirable.

Located between the pairs of sieve plates are a plurality of baffle plates 44, the lower ends of which are designed to be spaced just clear of the upper sieve plate of each pair.

A seed screen 45 extends across the lower part of the shoe D and is located below the sieves, such seed screen being provided with a discharge orifice 45ª through its lower end designed to register with the upper end of the discharge chute 36.

To facilitate in carrying off seeds or the like which collect in the bottom of the shoe D a transversely extending discharge chute 46 is provided which extends outwardly on one side of the machine and is adapted to be oscillated in a direction at right angles to the motion of the shoe D. This chute is located directly below the orifice extending between the downwardly sloping bottom plates 34 and 35 of the shoe D and is suspended at one end therefrom by the bale 47.

To carry off any seeds which are delivered from the shoe D, a transversely extending discharge chute 48 is mounted on the front thereof.

The fan E comprises an outer casing 49 having a discharge conduit 50 leading tangentially therefrom, such fan extending transversely across the machine, the casing being pivotally mounted to the frame B in such a manner as to permit of the discharge conduit 50 being rotated to a limited extent in a vertical plane.

The means which I employ for mounting the fan casing 49 to the frame B consists in providing a plurality of radially extending arms 51 having their outer ends rigidly fixed to the said casing, the inner ends of the said arms converging toward the boss 52 with which they are preferably formed integral, the outer face of such boss being designed to engage with the inner face of the bearing 53 mounted in the frame B.

The shaft 54 carries the blades 55 of the fan and is designed to be rotatably mounted in the boss 52 and the bearing 53, such shaft being provided on its outer end with a sprocket wheel 56 which is adapted to be driven by means of the chain 57 from the main driving sprocket 27.

To adjust the position of the discharge conduit 50 of the fan E a downwardly disposed rack 58 is mounted on the transversely extending member 7, such rack being adapted to engage with the pinion wheel 59 rotatably mounted on the side of the said discharge conduit and by means of which the said discharge conduit may be elevated or lowered through the medium of the crank lever 60, which is adapted to engage with the said pinion wheel and to operate the same.

To secure the fan E in the desired position a dog 61 is pivotally mounted on the side of the discharge conduit 50 and is adapted to engage with the pinion wheel 59.

The discharge of the air from the fan E is controlled by means of the plates 62 and 63 which are hinged intermediate of their ends to the upper and lower sides of the discharge conduit 50, the outer ends of the said plates converging toward each other and being adapted to be closed by means of the rods 64 and 65 pivotally mounted at one end to the said plates, the other end of such rods being adapted to slidably engage with angle brackets 66 and 67 mounted on the upper and lower sides of the discharge conduit 50, the said rods being adapted to make threaded engagement on their outer ends with the thumb screws 68 and 69. Any sliding action of the rods 64 and 65 is limited and controlled by means of the spiral springs 70 mounted thereon and located between the pivotally mounted ends of the said rods and the angle brackets 66 and 67.

The air discharged from the fan E impinges on the deflecting plate 70ª which extends transversely across the front of the machine and is pivotally mounted intermediate of the ends of its edges to the frame B, the oscillating motion of such plate being controlled by the rod 71, one end of which is pivotally mounted to the lower edge of the said plate, the other end being threaded and adapted to slidably engage with the angle bracket 72 mounted on the lower shoe F. The rod is provided with a spiral spring 73 mounted thereon and located between the angle bracket 72 and the lower edge of the plate 70ª, the tension of such spring being adjusted by the thumb screws 75 which makes threaded engagement with the rod 71.

The lower shoe F is located below the fan E and disposed at a suitable angle to the horizontal plane, the said shoe being provided with interchangeable screen 76.

The lower end of the shoe F is suitably supported by the roller 77 which is rotatably mounted on the rod 78 extending transversely across the back of the machine and suitably mounted on the frame B, the back of the said shoe being provided with a rack 79 mounted on the bottom thereof, such rack being adapted to engage with the pinion wheel 80 which is eccentrically mounted on the transversely extending rod 81 carried by the brackets 82.

Rotary motion is transmitted to the fan E by the driving sprocket wheel 27 which is designed to be manually operated by the crank lever 83, such driving sprocket being connected by the chain 57 to the sprocket wheel 56 which in turn oscillates the pinion wheel 31 by means of the pitman 84 so giving an oscillating movement to the upper shoe D, the lower shoe being oscillated by means of the pitman 85, one end of which is connected to the disk 86 mounted on that end of the fan shaft 54 remote from the sprocket wheel 56, the other end of the said pitman being connected to the pinion wheel 80.

The operation of the machine is as follows: The stock is fed into the receiving hopper C and the plate 15 actuated through the medium of the rod 20, the said stock gravitating down the inclined bottom 9 of the hopper and being delivered to the sieves 37 in the upper shoe D which sieves have been adjusted as previously described to suit the type of stock which it is desired to clean or separate. The smaller seeds pass through the orifices 40 and 41 of the plates 38 and 39 and are delivered to the seed screen 45 through which the lighter seeds pass and are delivered into the bottom of the shoe D from whence they are discharged by means of the transversely extending chute 46. It will be clear that the larger grain is delivered from the sieves 37 into the discharge chute 48 from which they are carried to any suitable place prior to bagging. The second grade of grain is discharged through the orifice 45ª of the seed screen 45 and the downwardly disposed discharge chute 36, the said grain falling on the deflecting plate 70ª on which the air from the fan E impinges. Chaff and the like is thus separated from this second grade of grain and blown away, the said grain being delivered to the lower shoe F where it is finally separated, the smaller grain passing through the screen 76 mounted on the lower shoe and falling beneath the machine while the larger grain gravitates down the said screen and is delivered at the front end thereof in a condition to be bagged.

The manner in which the discharge chute 46 is operated so that the motion is at right angles to that of the shoe D is quite unique and consists of a link 90, one end of which is mounted to the side of the shoe D, the other end being mounted to one arm of the horizontally disposed crank lever 91 pivotally mounted on the transversely extending member 7 of the frame B, the other end of the said crank lever being connected to the upper end of the bail 92 which is connected at its lower end to the back of the chute 46.

It will be understood that in the operation of the machine the deflecting plate 70ª will be oscillated by means of the lower shoe F and this oscillation greatly facilitates in the separating of the second size of grain.

The function of the baffle plates 44 is to prevent the grain from upending while it is gravitating down the sieves 37 as in this position the grain is liable to stick in the orifices 40 and 41 in the plates 38 and 39, while by keeping the said grain on the flat it will be clearly seen that only the small grain can enter the said orifices.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. In a grain separator and in combination, a receiving hopper, an upper screening shoe located below the said receiving hopper, a lower shoe, a pivotally mounted deflecting plate, below the discharge end of the upper shoe, means for operating the upper shoe and means for simultaneously operating the lower screening shoe and deflecting plate, as and for the purpose specified.

2. In a grain separator and in combination, a receiving hopper, a screening shoe located below the said hopper, a pivotally mounted fan located below the said shoe, plates hinged intermediate of their ends to the discharge conduit of said fan, means for adjusting the position of the said plates, resilient means for retaining the adjusted plates in a fixed position, means for operating the said fan and means for oscillating the said shoe, as and for the purpose specified.

In witness whereof I have hereunto set my hand in the presence of two witnesses.

RALPH ROBERT VENUS.

Witnesses:
JAMES MITCHELL,
P. GARROW.

Copies of this patent may be obtained for five cents each, by addressing the "Commissioner of Patents, Washington, D. C."